United States Patent [19]

Shinozaki et al.

[11] Patent Number: 4,482,275
[45] Date of Patent: Nov. 13, 1984

[54] METHOD AND APPARATUS FOR DISTRIBUTING POWDERED PARTICLES

[75] Inventors: Yoshinobu Shinozaki, Yokohama; Yasuno Motozo, Ichihara; Iwamura Tadaaki, Chiba; Marushima Hironari, Mobara; Tagawa Yoshiteru, Ichihara; Takabe Ryoji, Chiba; Moriyama Takashi, Tokyo; Fujii Shuzo, Tokyo; Achiba Keiichi, Tokyo; Oishi Hideo, Tokyo; Yanagihara Yasuo, Tokyo; Masuda Yoshiaki, Tokyo, all of Japan

[73] Assignees: Kawasaki Steel Corporation, Hyogo; Denka Consultant & Engineering Co., Ltd., Tokyo, both of Japan

[21] Appl. No.: 374,313

[22] Filed: May 3, 1982

[30] Foreign Application Priority Data

Dec. 12, 1981 [JP] Japan .................................. 56-200349

[51] Int. Cl.³ ............................................. B65G 53/66
[52] U.S. Cl. ........................................ 406/12; 406/24; 406/93; 406/124
[58] Field of Search ...................... 406/1, 14, 94, 124, 406/142, 155, 156, 12, 123, 93, 23, 24; 266/89, 44; 222/1

[56] References Cited

U.S. PATENT DOCUMENTS 3,230,016 1/1966 Gilbert et al. ....................... 406/124
3,720,351 3/1973 Coulter et al. ........................... 222/1

FOREIGN PATENT DOCUMENTS 0098030 7/1980 Japan .................................. 406/124
0052321 5/1981 Japan .................................. 406/142
0102431 6/1982 Japan .................................. 406/93
0107316 7/1982 Japan .................................. 406/14

Primary Examiner—John J. Love
Assistant Examiner—Daniel R. Edelbrock
Attorney, Agent, or Firm—Koda and Androlia

[57] ABSTRACT

Powdered particles are continuously distributed from a pressurized transporting vessel to a plurality of receiving ends such as tuyers of a blast furnace through a plurality of transporting pipes for each receiving end. A speed of gas supplied to the vessel is controlled depending on a weight changing ratio of the vessel and an internal pressure of the vessel, so that the speed of gas is maintained at constant. Booster gas is supplied to each of the transporting pipes. A discharging rate of the powdered particles is controlled by a cascade control system for each of the pipes by individually controlling a flow rate of booster gas depending on a differential pressure in each discharge nozzle of the pipes, or on an output of solid-gas mass-flow meter in each of the pipes, or on a solid-gas ratio corresponding to each length of the pipes and a mass-flow rate of the particles in the vessel per total gas flow rate.

12 Claims, 13 Drawing Figures

METHOD AND APPARATUS FOR DISTRIBUTING POWDERED PARTICLES

BACKGROUND OF THE INVENTION

1. Field of the Invention

The present invention relates to a method and apparatus for distributing powdered particles from a single transporting vessel to a plurality of receiving ends. More particularly, the present invention relates to a method and apparatus for continuously distributing the powdered particles such as pulverized coal, refining agent and so forth from a single transporting vessel to a plurality of receiving ends such as tuyeres of a high pressure blast furnace without using a distributor or mechanical discharge device at any desired discharging rate.

2. Description of the Prior Art

According to a conventional method and apparatus for continuously supplying materials such as pulverized coal or powdered particles to a plurality of receiving ends disclosed, for example, in Japanese Patent Publication No. 29684/76 (U.S. Pat. No. 3,720,351 and West German Pat. No. 2,243,439), two or more batch tanks installed in parallel are alternatively used and a distributor is further installed to supply the materials into tuyeres. To put the above method into practice, however, facilities of large scale are required, and wide installation areas are needed accordingly, resulting in complicated pipe line systems. Furthermore, the fatal defect is that it is not allowed to individually control the discharging rate of the powdered particles in each of transporting pipes.

An example of a dispatching transportation system of the serially arranged type has been disclosed in U.S. Pat. No. 3,230,016. According to this system, a distributor consists of an inverted conical hopper having double cones with blow pipes connected to a lower chamber. Therefore, the fabrication of vessel structure tends to become complicated. Further, since the lower portion of the vessel is down-stream type for discharging the materials, discharge nozzles having a relatively small diameter must be equipped with for the powdered particles having strong adhesive force (powdered particles exhibit stronger adhesive force as the particle becomes finer to prevent floodability that will take place intermittently). However, chocking or plugging inevitably occurs in the discharge nozzles as the diameter becomes smaller. In other words, it is difficult to prevent both phenomena of floodability and plugging, simultaneously. Namely, the above system is not applicable for transporting powdered particles having poor flowability. That is, the powdered particles cannot be selectively used for wide range of applications.

SUMMARY OF THE INVENTION

It is, therefore, an object of the present invention to provide a method and apparatus in which the powdered particles can be transported at relatively large discharging rate and continuously, enabling the powdered particles to be selectively used for wide range of applications.

It is another object of the present invention to provide a method in which the powdered particles can be transported at any desired discharging rate even when the transporting pipes have different lengths and even when back pressures are different in the receiving ends, e.g., even when receiving ends or openings are located at different positions in a blast furnace.

It is yet another object of the present invention that fabrication of the structure as a whole can be simplified and required facilities are minimized.

According to the present invention, a lower pressurized dispatch-transporting vessel having a plurality of transporting pipes with their ends on one side being opened to a common fluidized bed, and an upper pressurized charging vessel for feeding materials or powdered particles to the lower transporting vessel are connected in series in the vertical direction, the flow rate of transporting gas supplied to the transporting pipes is controlled by detecting the discharging rate of the powdered particles in the transporting pipes under the condition in which the speed of gas flowing through the fluidized bed of the lower transporting vessel is maintained substantially at a constant value nearly that meets the total desired discharging flow rate of transportation, such that the powdered particles can be directly transported to a plurality of receiving ends through the individual transporting pipes at desired discharging rates, and that the powdered particles can be supplied maintaining predetermined discharging rates even when the pressure is changed at the receiving ends.

DESCRIPTION OF THE PREFERRED EMBODIMENTS

Figure 1:
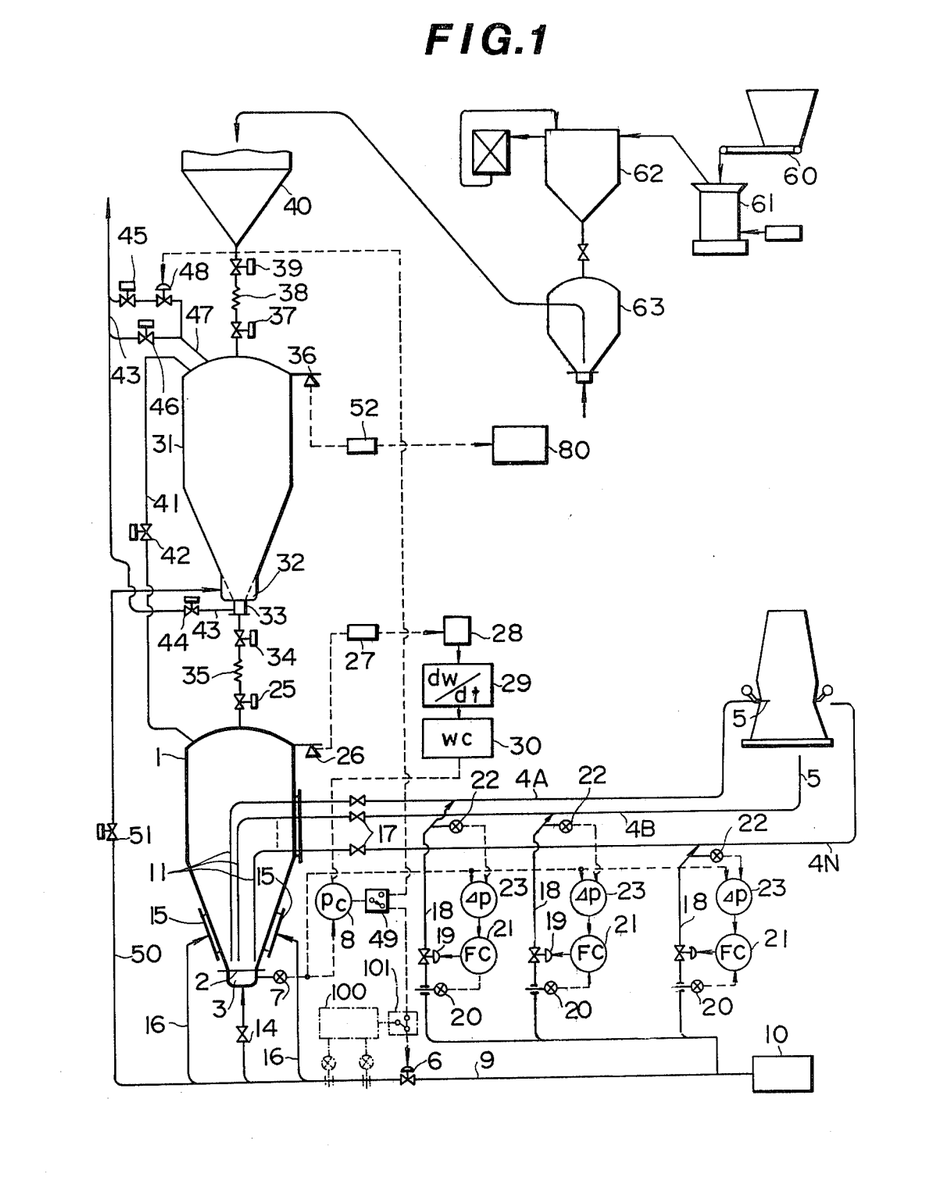
FIG. 1 is a system diagram illustrating an embodiment of an apparatus for distributing powdered particles according to the present invention.

Embodiments of the present invention are shown in FIGS. 1 to 13. First, the apparatus of FIG. 1 is described below in conjunction with a method therefor.

Powdered particles to be transported are fed into a lower pressurized dispatch-transporting vessel 1 through a receiving hopper and charging vessel explained hereinafter. The transporting vessel 1 is so designed that the vessel is isolated in terms of weight from others by a weight isolating device such as a special bellows explained hereinafter in order to make certain that a measuring device provided for measuring the weight change of the vessel functions properly.

Discharge nozzles 11 of a plurality of transporting pipes 4 connected to receiving ends or tuyeres 5 in a blast furnace are opposed to a fluidized bed 2 which consists of a porous plate in the transporting vessel, such that the powdered particles in the vessel are injected into each of the receiving ends.

Pressurized gas for fluidization from a pressurized gas supply source 10 is supplied always at substantially a constant flow rate into a chamber 3 located under the fluidized bed 2 through a line 9. Reference numeral 6 denotes a pressure adjusting valve which is continuously controlled responsive to the pressure in the chamber 3. Reference numeral 7 denotes a pressure detector, and reference numeral 8 denotes a pressure controller which produces an output signal to operate the pressure adjusting valve 6. Therefore, the pressure in the fluidized bed, i.e., the flow rate of gas which passes through the fluidized bed, is maintained nearly at a constant value.

The pressure adjusting valve 6 may alternatively be operated depending upon a difference output between a setpoint value and a value given by the following equation;

$$V = \frac{Q}{A} = \frac{1}{A} K \sqrt{Pd} \cdot \sqrt{\frac{Pn}{P_1} \cdot \frac{T_1}{Tn}}$$

where Q denotes a flow rate of gas, A denotes cross-sectional area of the line, K denotes a proportional constant, Pd denotes a differential pressure in an orifice installed in the line, Pn and Tn denote a pressure and temperature at the temperature of 0° K. and absolute pressure atm. and $P_1$ and $T_1$ denote an absolute pressure and temperature when the measurement is taken, which difference output is obtained by introducing, into a pressure compensating gas flow controller 100, detection signals produced by a pressure detector and the orifice that are installed in the line 9. The numeral 101 designates a switch.

Reference numeral 14 denotes a pressure-reducing valve, and 15 denotes aerators installed on tapered walls of the transporting vessel. The aerators produce horizontal air stream that is headed toward the central axis of the vessel and a rising air stream that upwardly rises through the vessel, to prevent the occurrence of bridge phenomenon of the powdered particles. The aerators 15 are served with part of the pressurized gas via branch pipes 16.

Transporting valves 17 provided for each of the plurality of transporting pipes 4 at the outside of the vessel are fully opened when the powdered particles are being transported, and are fully closed when the powdered particles are not transported. Booster gas supply pipes 18 are connected to each transporting pipes on the secondary side of the transporting valve. Each booster gas supply pipe 18 is equipped with a flow-rate adjusting valve 19, a flow-rate detector 20, and a flow-rate controller 21. Further, a pressure detector 22 is provided for the pipe 18 near a portion where it is connected to the transporting pipe. A differential pressure adjusting controller 23 is provided as shown in FIG. 1 and is served with the output signal from the pressure detector 22 and with the output of the detector 7 which detects the pressure in the chamber. The flow-rate controller 21 therefore is controlled in a cascade method by the output of the differential pressure adjusting controller 23. In FIG. 1, the booster gas supply pipe 18 is shown at a deviated position in order to clarify the drawing. In practice, however, the pipe 18 is connected just behind the transporting valve 17.

In the present invention, by setting each of the flow-rate controller 21 at each predetermined value, the powdered particles can be transported while maintaining the discharging rate of the powdered particles in each of the transporting pipes 4 at each of booster gas flow controlled by the flow-rate controller 21. Namely, in transporting the powdered particles, if the discharging rate of the powdered particles reduces in the transporting pipes 4, the pressure loss reduces in the pipes and the differential pressure decreases. Conversely, if the discharging rate of the powdered particles increases, the differential pressure increases. In the former case, therefore, the flow-rate adjusting valve 19 is automatically operated toward the direction in which it closes; i.e., the flow rate of booster gas is reduced to increase the discharging rate of the powdered particles. In the latter case, the flow-rate adjusting valve 19 is operated toward the direction in which it opens; i.e., the flow rate of booster gas is increased to decrease the discharging rate of the powdered particles.

Figure 4:
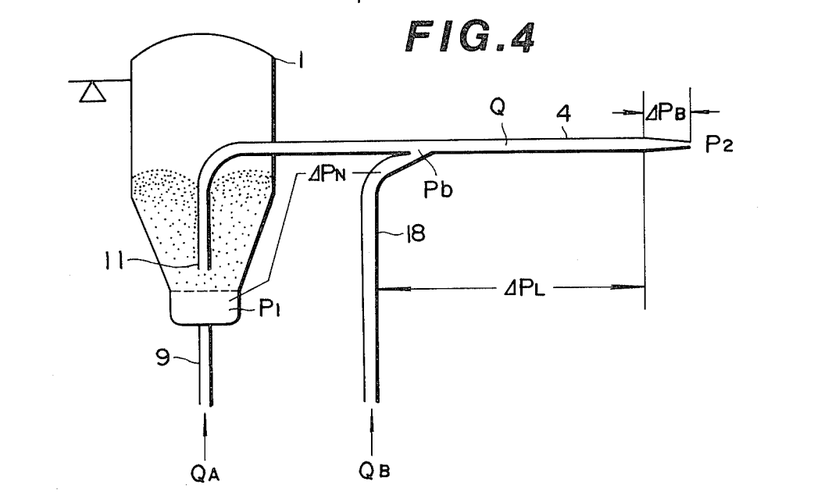
FIG. 4 is a diagram illustrating the principle of the control of pressure difference according to the present invention.

The principle of operation of the above will be described below in detail with reference to FIGS. 4 to 6.

Where the pressure in the fluidized bed of the vessel 1 is denoted by $P_1$, the differential pressure in the discharge nozzle 11 by $\Delta PN$, the pressure loss in the transporting pipe by $\Delta PL$, the pressure loss in the burner 5 by $\Delta PB$, and the pressure at the receiving ends, i.e., the tuyere pressure by $P_2$, the pressure at the transporting point $P_1$ (i.e., the pressure $P_1$ in the fluidized bed) is given by, $$P_1 = \Delta PN + \Delta PL + \Delta PB + P_2 \qquad (1)$$

Here, there exists a relation, $$\Delta PN \approx K_1 \, dw/dt$$

($K_1$ is a proportional constant)
between the differential pressure $\Delta PN$ in the discharge nozzle and the discharging rate $dw/dt$ of the powdered particles.

Figure 5:
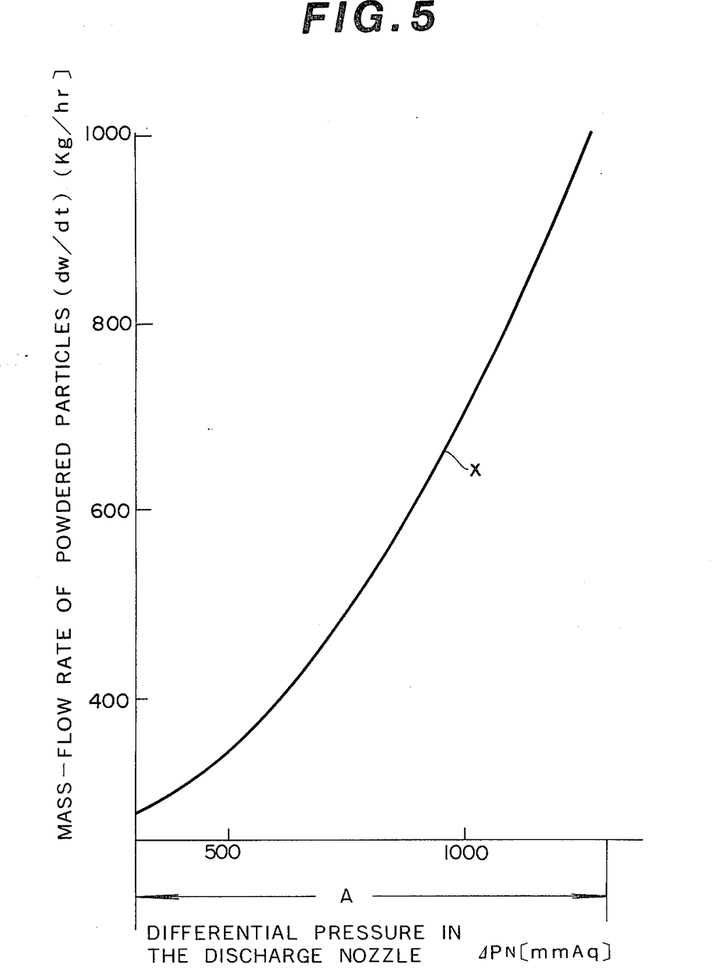
FIGS. 5 to 12 are characteristics diagrams for illustrating the operation of the present invention.

FIG. 5 is a characteristic diagram showing the above-mentioned relation, i.e., showing a relation between the differential pressure $\Delta PN$ (mmAq) and the discharging rate $dw/dt$ (kg/hr) when the pressure $P_1$ in the fluidized bed is 4.0 kg/cm$^2$G and the tuyere pressure $P_2$ is 2.0 kg/cm$^2$G.

A characteristic curve X may assume a linear curve over a normally used range A.

In the right side of the equation (1), the differential pressure $\Delta PN$ assumes a very small value and can be neglected. The pressure loss $\Delta PL$ in the transporting pipe is given as the sum of pressure loss $\Delta PG$ by the gas only and the pressure loss $\Delta PS$ by the powdered particles only, i.e., given as $\Delta PL = \Delta PG + \Delta PS$, whence the equation (1) can be rewritten as $$p_1 \approx \Delta PG + \Delta PS + \Delta PB + P_2 \qquad (2)$$

Further, the discharging rate $dw/dt$ of the powdered particles vary in proportion to $\Delta PS$. Therefore, the above equation (2) can be rearranged with regard to $\Delta PS$ as follows:

$$\Delta PS \approx P_1 - P_2 - \Delta PB - \Delta PG \qquad (3)$$

Further, the loss $\Delta PG$ of gas pressure is given by the Fanning's formula as follows:

$$\Delta PG = K_2 Q^2$$

(where $K_2$ is a proportional constant, and Q is a total flow rate of gas)

The total flow rate Q of gas is obtained by subtracting the amount of gas $K_4 \, dw/dt$ which has flown into the vessel 1 as the powdered particles are discharged from the vessel 1, from the sum of the flow rate QA of pressurized gas and the flow rate QB of booster gas. Namely, the total flow rate Q is given by, $$Q = QB + QA - K_4 dw/dt$$

In practice, $Q \approx 1.1 QB$.

Therefore, the equation (3) is given as, $$\Delta PS = K_3 \frac{dw}{dt} = P_1 - P_2 - \Delta PB - K_2(1.1 \, QB)^2 \quad (4)$$

If $P_1$, $P_2$ and $\Delta PB$ do not change, it will be understood from the above equation that the pressure loss $\Delta PS$ by the powdered particles decreases with the increase in the flow rate QB of booster gas and, hence, the discharging rate of the powdered particles decreases. Characteristics curves $Y_1$, $Y_2$, $Y_3$ and $Y_4$ of FIG. 6 illustrate relations between the flow rate QB of booster gas and the discharging rate dw/dt of the powdered particles where the pressure $P_1$ in the fluidized bed is controlled at 3.5 kg/cm$^2$G, 4 kg/cm$^2$G, 5 kg/cm$^2$G and 6 kg/cm$^2$G while setting the difference between the pressure $P_1$ in the fluidized bed and the tuyere pressure $P_2$ at $P_1 - P_2 = 2.0$ kg/cm$^2$.

Figure 6:
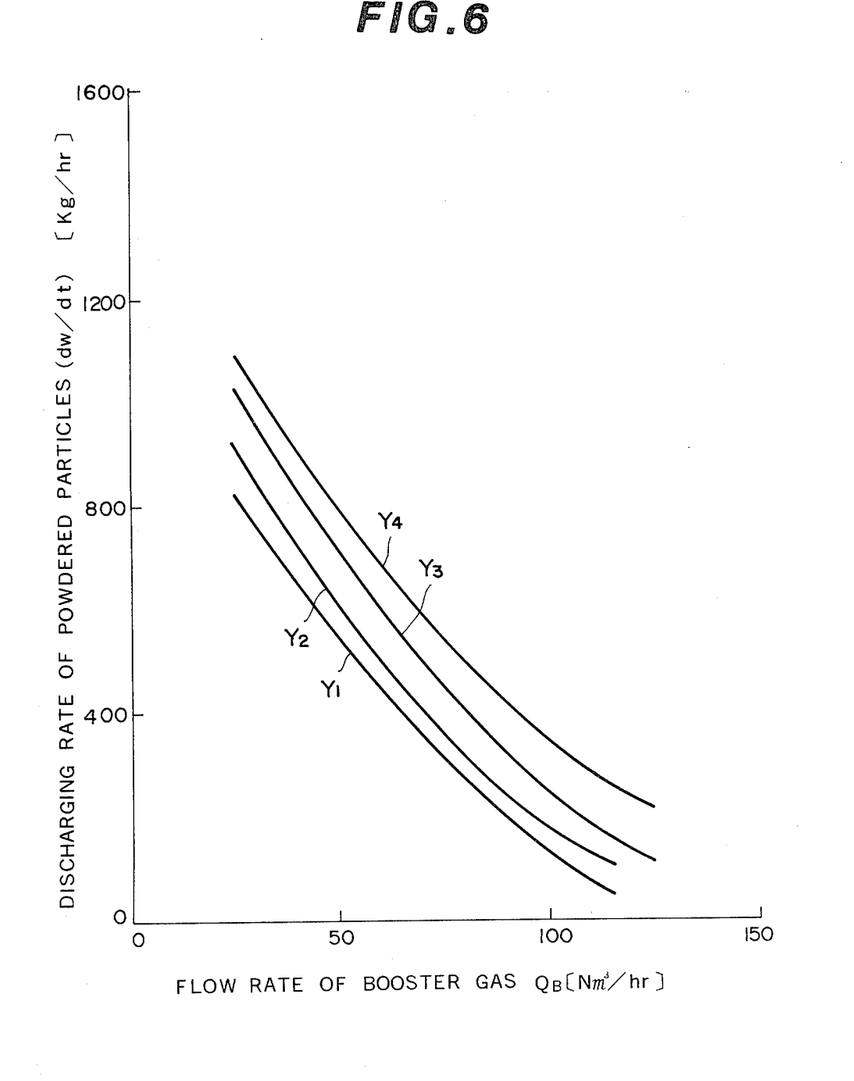

It will be understood from FIG. 6 that, when the tuyere pressure $P_2$ remains constant, the discharging rate dw/dt of the powdered particles decreases with the increase in the flow rate QB of booster gas, and the discharging rate dw/dt of the powdered particles increases with the decrease in the flow rate QB of booster gas.

When the tuyere pressure $P_2$ undergoes variation, the loss $\Delta PB$ of burner pressure should be set to $\Delta PB \approx (0.2$ to $0.4)(P_1 - P_2)$, whereby the pressure on the primary side remains constant owing to the principle of critical orifice, i.e., $\Delta PG + \Delta PS = P_1 - P_2 - \Delta PB = $ const.

As mentioned in the foregoing, the pressure loss $\Delta PS$ by the particles alone is controlled by varying the pressure loss $\Delta PG$, namely the flow rate QB of booster gas, and thus the discharging rate dw/dt of the powdered particles can be controlled.

The increasing or decreasing of the discharging rate dw/dt of the powdered particles can be detected by detecting the differential pressure $\Delta PN$ in the discharge nozzle as mentioned above. Therefore, the control accuracy can be further increased if the flow rate QB of booster gas is controlled by the differential pressure $\Delta PN$ in the nozzle. In addition to the air, any gas such as inert gas or exhaust gas can be used for the transporting system.

Below is mentioned the method for operating the apparatus of the present invention.

It is assumed that the transporting vessel 1 is filled with the powdered particles. When the particles are to be discharged under this condition, the transporting valves 17 and feed valves 25 are closed, the pressure adjusting valve 6 is opened, the pressurized gas is supplied to the fluidized bed and to the aerators 15 to fluidize the powdered particles, and the pressure in the transporting vessel is increasing up to a required value.

Then, the flow-rate adjusting valves 19 are opened under the condition in which the pressurized gas is continuously supplied, to introduce the transporting gas into the transporting pipes. The transporting valves 17 are then fully opened, whereby the fluidized particles are sent into the transporting pipes 4 through the discharge nozzles 11 provided at the vessel ends of the transporting pipes, and are transported to the receiving ends.

The amounts of the powdered particles discharged into the transporting pipes 4 vary depending upon the flow rates of booster gas fed through the pipes 18. Therefore, the powdered particles can be supplied into the pipes at a constant rate or at desired rates if the flow rates of booster gas into the transporting pipes are individually controlled by detecting the differential pressure that stems from the pressure loss in the discharge nozzle 11 of each of the transporting pipes.

The weight of the transporting vessel 1 is measured at all times by a measuring device 26 such as load cells. By differentiating the measured value by a differentiator 29 in regard to the time, a weight changing ratio of the vessel i.e., change in the mass-flow rate of the powdered particles can be obtained. The mass-flow rate is then compared with a set point of a weight adjusting controller 30, and the pressure adjusting controller 8 is controlled in a cascade control system in response to the adjusted output that corresponds to deviation of the measured value of the vessel from the set point of the weight adjusting controller 30, thereby to maintain the mass-flow rate of the powdered particles from the transporting vessel 1 constantly or to increase or decrease same.

According to the above-mentioned distributing transportation system, the discharging rate can be easily corrected even when the equivalent lengths of the transporting pipes are so different as, for example, 4A > 4B.

Figure 7:
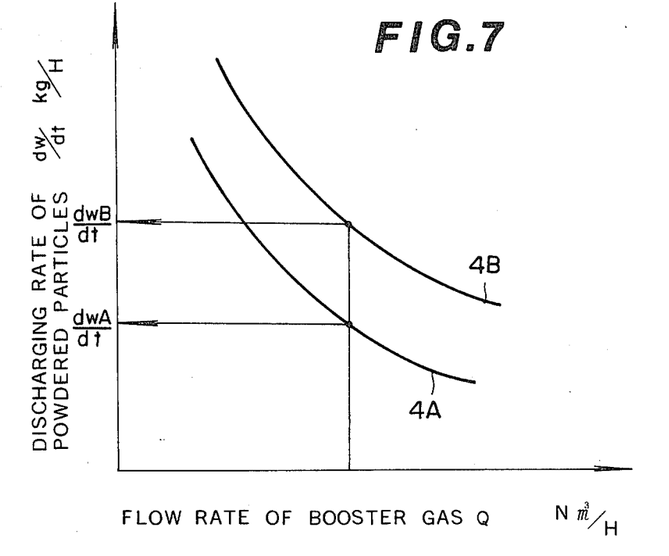

FIG. 7 illustrates relations between the flow rate QB (Nm$^3$/h) of booster gas and the discharging rate dw/dt (kg/h) of the powdered particles when the pressure in the transporting vessel and the pressure at the receiving ends are constant. That is, when the flow rate QB of booster gas is constant, the discharging rate of the powdered particles vary nearly in reverse proportion to the equivalent length of the pipe.

Figure 8:
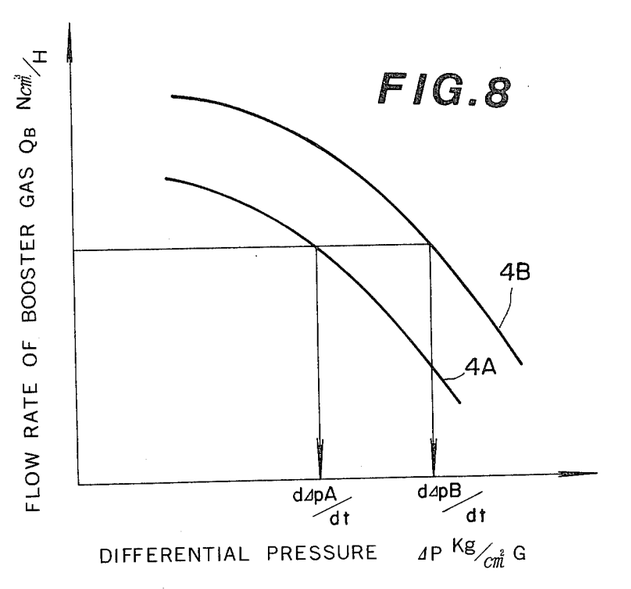

FIG. 8 illustrates relations between the flow rate QB of booster gas and the differential pressure $\Delta P$ (kg/cm$^2$G) in the transporting pipe; when the flow rate of booster gas is constant, the differential pressure increases in reverse proportion to the equivalent length of the pipe.

Figure 9:
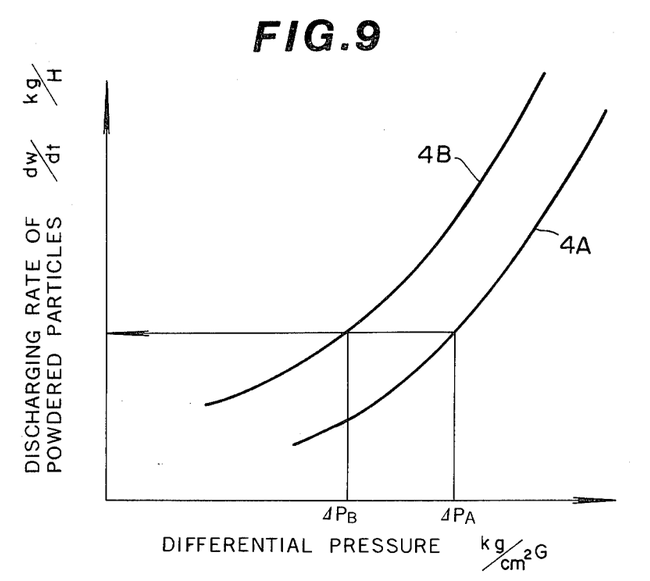

FIG. 9 illustrates relations of the discharging rate dw/dt of the powdered particles relative to the differential pressure $\Delta P$. To equalize the discharging rate of the powdered particles in each of the transporting pipes, the differential pressure adjusting controllers 23 should be set to differential pressures $\Delta PA$, $\Delta PB$ that are proportional to the equivalent lengths. To control desired discharging rate of the powdered particles, on the other hand, values of differential pressures at the time when equal rate is obtained should be increased or decreased depending upon the set point.

According to the present invention, therefore, the lengths of transporting pipes need not be selected to maximum lengths. Therefore, the design can be simplified, and space required for installing the facilities can be minimized.

Figure 2:
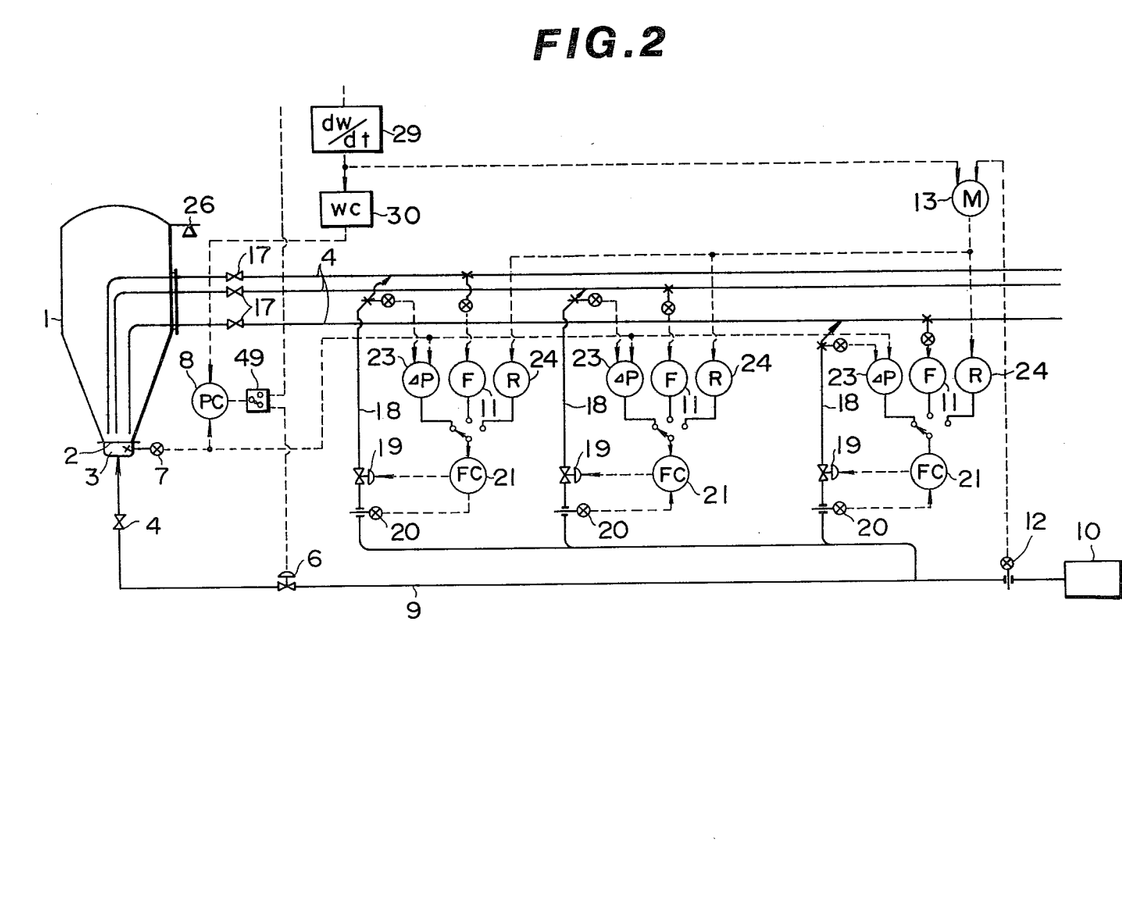
FIG. 2 is a control system diagram illustrating another embodiment of the apparatus, in which two modifications are also illustrated.

In place of control in response to the output of the differential pressure adjusting controller 23, the flow-rate controller 21 installed in the booster gas supply pipe 18 may be controlled in a cascade control system by the output of a solid-gas mass-flow meter 11, as shown by chain lines in FIG. 2. In case where the pressure at the receiving ends does not fluctuate, the flow-rate controller 21 can be controlled in a cascade control system by the output of a ratio-setter 24 having a ratio that corresponds to the equivalent length of transporting pipe 4 or that corresponds to the desired discharging rate, which setter is supplied by an output of a solid-gas ratio controller 13 that is produced by a detection signal of a flow-rate detector 12 which detects the flow rate of the total pressurized gas of the pressurized gas supply source 10 and an output signal of a lower vessel weight differentiator 29 which will be explained in detail hereinafter. These two alternative methods as mentioned above are all illustrated in FIG. 2, but one of them is properly selected in a practical use.

Figure 10:
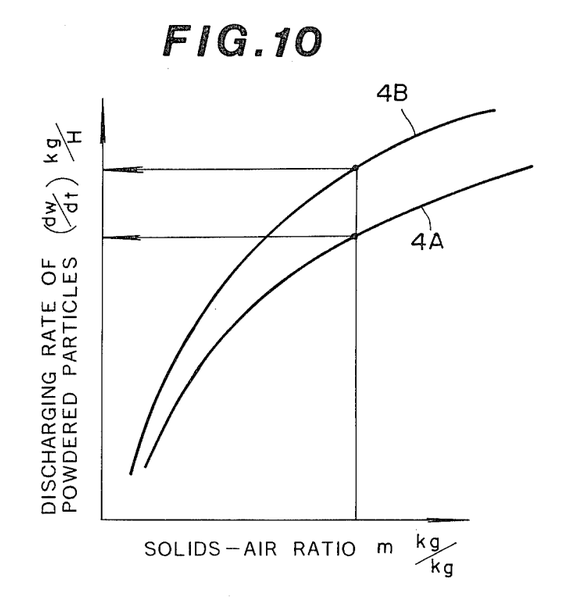

The solid-gas ratio controller 13 acts as a cascade controller and will be explained below in further detail with reference to FIGS. 10 to 12. The pressure in the transporting vessel 1 is maintained at a set-point value by the pressure adjusting valve 6. Therefore, when the back pressure at the receiving ends of the transporting pipes 4 remain constant and when equivalent lengths of two given transporting pipes have, for example, a relation 4A>4B, the discharging rate of the powdered particles relative to the solid-gas ration m (kg/kg), i.e., the change of discharging rate dw/dt (kg/h) becomes as shown in FIG. 10. Namely, if the solid-gas ratio m is set at constant, the discharging rate varies in reverse proportion to the equivalent length of the transporting pipe 4.

Figure 12:
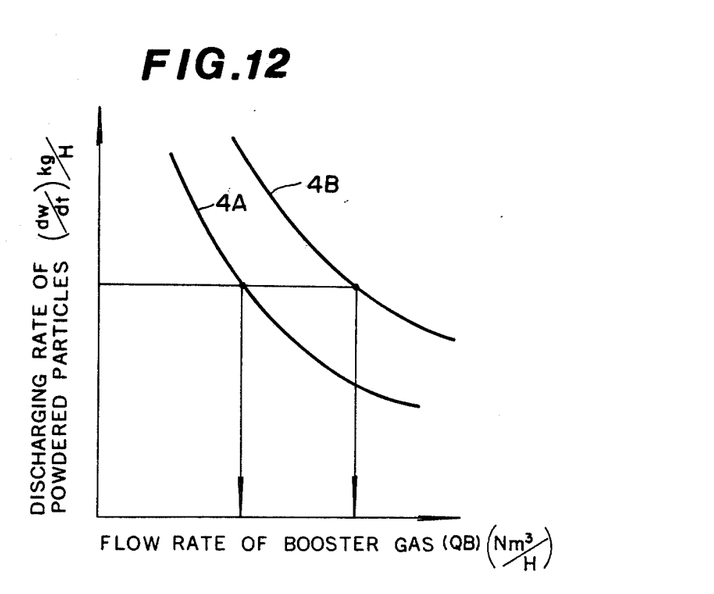

Further, FIG. 12 illustrates relations between the flow rate QB of booster gas into the transporting pipes 4 and the discharging rate of the powdered particles. To maintain the discharging rate at constant the flow rate of booster gas should be adjusted.

Figure 11:
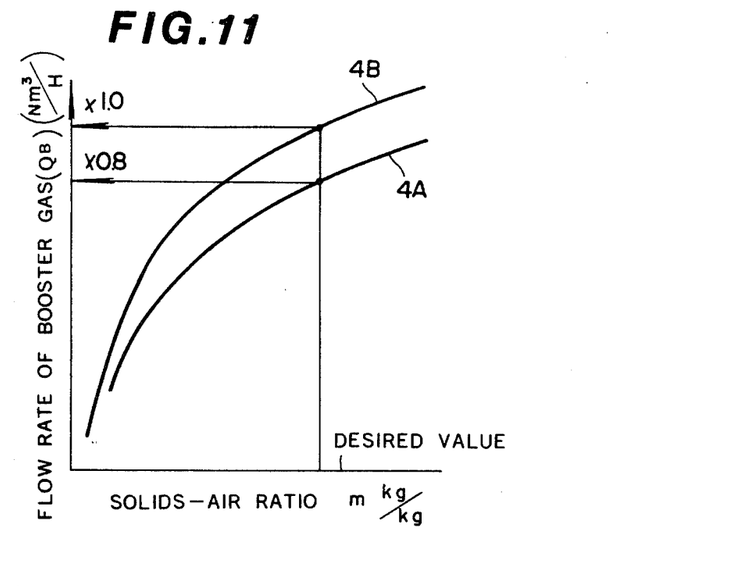

FIG. 11 illustrates a relation of the flow rate QB of booster gas to the solid-gas ratio m. To maintain the solid-gas ratio m at constant, the flow rate of booster gas should be adjusted in accordance with the equivalent length of the transporting pipe. The powdered particles can be transported into the pipes at a constant rate or at desired rates by adjusting the flow rates QB of the booster gas by varying a ratio of the ratio-setter 24 with the transporting pipe having the longest or shortest equivalent length as a reference.

When the pressure is changed at the receiving ends, the powdered particles required for the receiving ends can be supplied at desired solid-gas ratios or at a desired discharging rate by changing setpoint values of the pressure adjusting controller 8, booster gas flow-rate controller 21 and weight adjusting controller 30.

According to the distributing transportation method and apparatus of the present invention as mentioned above, the powdered particles can be directly injected from a single transporting vessel to a plurality of receiving ends at any discharging rate. Further, the distributing transportation can be continuously performed for a long time by replenishing the powdered particles in the transporting vessel, while continuing the continuous distributing transportation, as will be mentioned hereinafter.

The method of replenishing the powdered particles which makes the continuous distributing transportation possible will be described below with reference to the drawings. The reference numeral 31 denotes a charging vessel having an aerator 32 and an exhaust portion 33 at the lower portion thereof. The exhaust portion is connected to a feed valve 25 at an upper portion of the transporting vessel 1 via a feed shutoff valve 34 and a dead weight isolating bellows 35 of a pressure-balance type. Reference numeral 36 denotes a measuring device which is constructed in the same manner as the measuring device 26 provided for the transporting vessel. In order for the measuring device 36 to operate precisely, the weight of the charging vessel 31 is isolated not only by the above-mentioned bellows 35 but also by the bellows 38 which is connected between the charging vessel 31 and receiving hopper 40. Reference numeral 37 denotes a feed valve for introducing the material, and 41 denotes a conduit pipe between the upper portion of the transporting vessel 1 and the upper portion of the charging vessel 31 to circulate the flow of solid-gas mixture. The conduit 41 is provided with a control valve 42. Reference numeral 43 denotes a dispersing pipe communicated with the exhaust portion 33 of the charging vessel 31, and 44 denotes a control valve. An exhaust pipe 47 connected to the top portion of the charging vessel is branched off in parallel, and the branches are each provided with control valves 45 and 46. Further, an exhaust pressure adjusting valve 48 is provided on the primary side of the control valve 45. The secondary sides of the control valves 45 and 46 are connected to the atmosphere by the dispersing pipe 43.

The pressure adjusting valve 48 is operated by the adjusted output of the pressure adjusting controller 8 of the transporting vessel. As will be mentioned later, the output signal of the pressure adjusting controller 8 is changed over when a switch 49 is operated while the powdered particles are being supplied.

Figure 13:
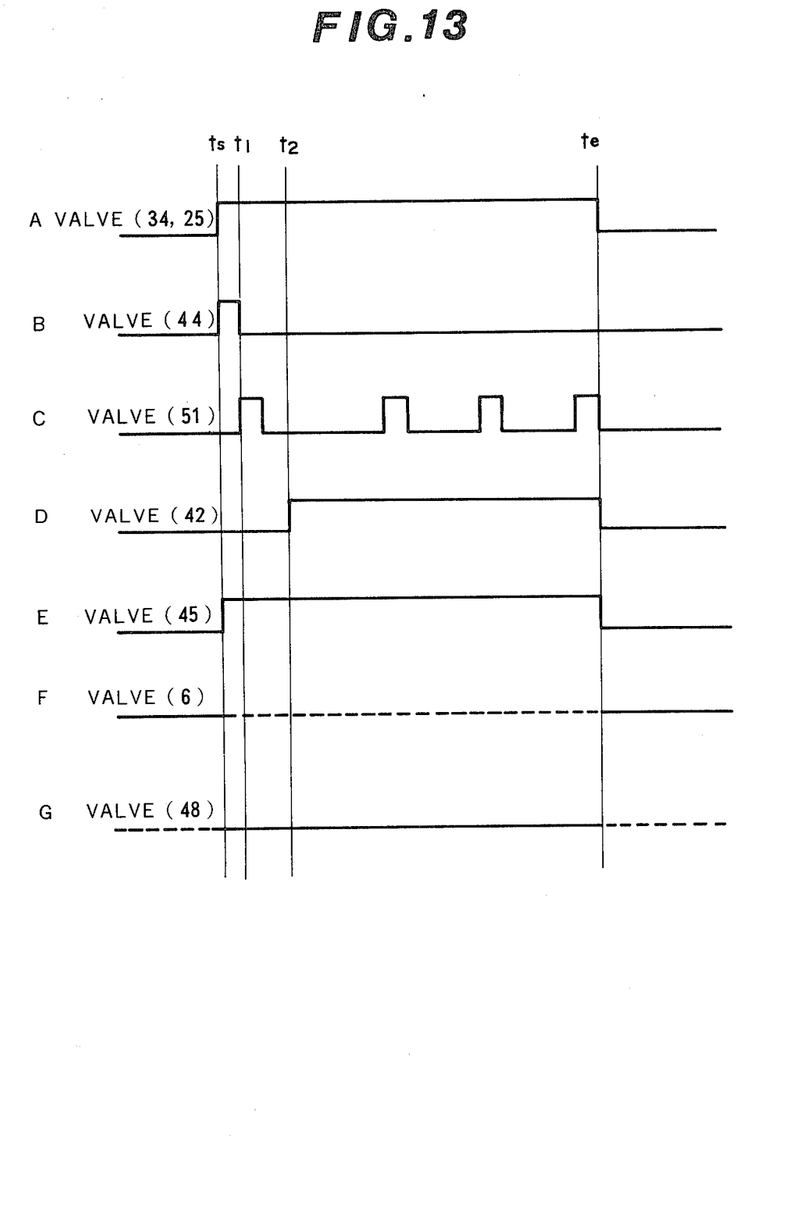
FIG. 13 is a sequence chart illustrating the operation of an apparatus of the present invention.

In transporting the powdered particles, when the amount of the particles in the transporting vessel 1 becomes smaller than a set value, the pressure in the charging vessel 31 is equalized as same pressure as the transporting vessel 1 by the output of the measuring device 26. That is, feed shutoff valves 34 and 25 are opened at a moment $t_s$ of initiating the feed as shown in FIG. 13, and the control valve 44 is temporarily opened, whereby the powdered particles are fluidized near the exhaust portion 33 owing to the purging effect created by the pressurized gas. At the same time, the control valve 45 is opened as shown in FIG. 13 at E, and the switch 49 is changed over so that the exhaust pressure adjusting valve 48 can be controlled by the adjusted output of the pressure controller 8. In this state, the pressure gas adjusting valve 6 is placed under the non-controlled state, that is, the angle of the adjusting valve 6 is kept constantly. Furthermore, the output of the weight adjusting device is maintained at a value which is equal to an initial value immediately before the replenish, and accordingly, the total discharging rate of the particles fed to the transporting pipes is maintained substantially at constant. Then, the pressure in the transporting vessel 1 and in the charging vessel 31 is equalized and is controlled at a required value by the valve 48, and whereby the feed of the powdered particles is initiated from the charging vessel 31 into the transporting vessel 1. Then, as shown in FIG. 13 at D, the control valve 42 is opened at a moment $t_2$, and part of the particles fed into the transporting vessel 1 is fed back to the top portion of the charging vessel 31 together with the amount of the compressed gas corresponding to the volume of the particles in the vessel 1 through circulation conduit 41, so that the pressure in the vessels 1 and 31 is equally maintained. The control valve 51 connected to the aerator 32 of the charging vessel 31 is intermittently operated starting from the moment $t_1$ as shown in FIG. 13 at C to intermittently feed the pressurized gas in the aerator, so that the powdered particles are fluidized without being bridged or without being aggregaded to each other and are allowed to fall smoothly.

As mentioned above, according to the present invention, the exhaust pressure adjusting valve 48 is operated by the output of the pressure controller 8 while the powdered particles are being fed. Therefore, the pressure in the charging vessel and in the transporting vessel becomes equal to each other and varies simultaneously. The pressure in the chamber 3 of the transporting vessel is accordingly maintained substantially at constant.

As the amount of the powdered particles in the charging vessel decreases below a set point, the measuring device 36 produces output at a moment $t_e$ to close the feed shutoff valve 34, feed valve 25 and control valves 42 and 45. At the same time, the switch 49 is changed over, and the pressure controller 8 again operates the valve 6 to adjust the pressure of the gas. Consequently, the state before charging is resumed, i.e., the steady-state transporting state is taken again.

Thereafter, the control valve 46 is opened so that the pressure in the charging vessel 31 becomes equal to the atmosphere. Further, the valves 37 and 39 are opened to receive the powdered particles from the receiving hopper 40. After the particles have been charged into the charging vessel, the valves 37 and 39 and control valve 46 are closed again.

The above-mentioned operations are repeated every after the amount of the powdered particles in the transporting vessel 1 reduces below a set value, and the distributing transportation from the transporting vessel is continuously carried out.

While the particles are being charged, furthermore, the pressures in the upper and lower vessels 1 and 31 have been equalized. Using an ordinary bellows, therefore, the upper charging vessel 31 is upwardly pushed by the pressure in the bellows, and the lower transporting vessel 1 is downwardly pushed by the pressure in the bellows.

Figure 3:
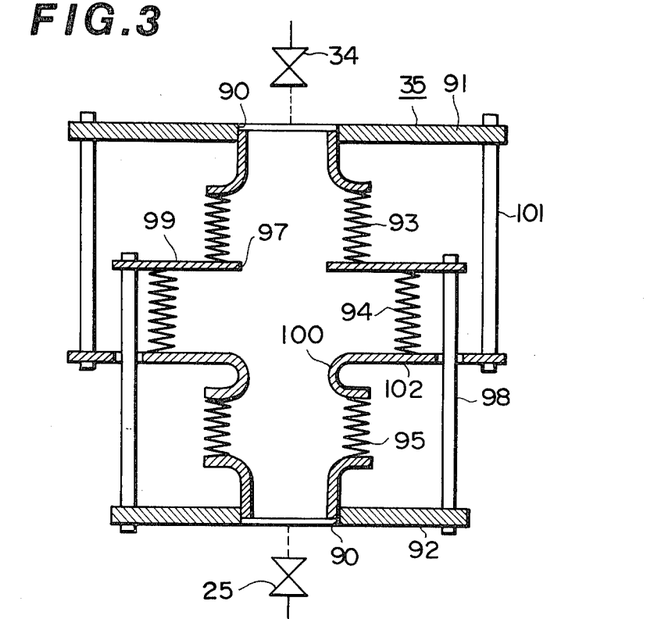
FIG. 3 is a section view of a pressure-balanced bellows according to the present invention.

The present invention therefore makes use of a pressure-balanced bellows 35 as shown in FIG. 3.

The bellows 35 consists of an upper bellows 93, a middle bellows 94 and a lower bellows 95 that are disposed between parallel discs 91 and 92 that have center openings 90. The upper end of the upper bellows 93 is connected to the disc 91, and the lower end thereof is connected a middle disc 99 which has a center opening 97 and which is connected to the disc 92 by connecting rods 98. The upper end of the middle bellows 94 is connected to the middle disc 99, and the lower end thereof is connected to a disc 102 that has a center opening 100 and that is connected to the disc 91 by connecting rods 101. Further, the upper end of the lower bellows 95 is connected to the disc 102, and the lower end thereof is connected to the disc 92. Further, the disc 91 is connected to the feed shutoff valve 34, and the disc 92 is connected to the feed valve 25.

The thus pressure balanced bellows gives the following advantage. That is, when the feed valve 25 is opened to introduce the pressure in the transporting vessel 1 into the bellows 35, thrust force produced in the middle bellows 94 is cancelled by thrust force produced in the bellows 93 and 95, and the feed valve 25 is isolated from the feed shutoff valve 34 in regard to dead weight. Accordingly, sufficient measuring accuracy can be assured for the transporting vessel 1 and for the charging vessel 31.

The powdered particles can be supplied to the receiving hopper 40 by any method. If the powdered particles to be supplied is pulverized coal, the raw coal is usually fed into a dry pulverizer 61 by a measuring belt conveyer 60 at any rate. The coal is then batchwisely fed into from a pressurized feeding vessel 63 via a storage hopper 62.

Further, the consumption per day can be easily and accurately measured by an integrating indicator 80 since the measuring device 36 of the vessel 31 measures the total amount of the particles passing therethrough, independently of the operational condition.

According to the present invention as mentioned in the foregoing, the rate of transporting the powdered material can be accurately and quickly adjusted even when pressure has changed at a plurality of receiving ends or even when it is required to change the transporting rate. Further, since the apparatus is operated continuously, the transporting vessel can be fabricated in a small size and, hence, reduced space is required for installing the facilities. Moreover, the apparatus can be designed without the need of giving attention to the lengths of pipes.

What we claim is:

1. A method of continuously distributing and supplying powdered particles from a pressurized transporting vessel with a weight measuring device to a plurality of receiving ends through a plurality of transporting pipes for each of the receiving ends, each of said transporting pipes communicating a fluidized bed in the transporting vessel with the receiving ends, said method comprising the steps of:

controlling a speed of gas passing through the fluidized bed in the transporting vessel in accordance with a control signal depending upon a primary parameter of a weight changing ratio of the transporting vessel and upon a secondary parameter of an internal pressure of the transporting vessel, so that said speed of gas is continuously maintained substantially at a constant value; and controlling a discharging rate of the powdered particles in each of the transporting pipes by individually controlling a flow rate of booster gas which is supplied into each of the transporting pipes.

2. A method of continuously distributing and supplying powdered particles from a lower pressurized dispatch-transporting vessel with a weight measuring device to a plurality of receiving ends through a plurality of transporting pipes for each of the receiving ends, each of said transporting pipes communicating a fluidized bed in said lower transporting vessel with the receiving ends, said lower transporting vessel being communicated in series through a control valve to an upper charging vessel, said method comprising the steps of:

controlling a speed of gas passing through the fluidized bed in said lower transporting vessel in accordance with a control signal depending upon a primary parameter of a weight changing ratio of said lower transporting vessel and upon a secondary parameter of an internal pressure of said lower transporting vessel, so that said speed of gas is continuously maintained substantially at a constant value;

controlling a discharging rate of the powdered particles in each of the transporting pipes by individually controlling a flow rate of booster gas which is supplied into each of the transporting pipes;

opening said control valve between said two vessels after equalizing internal pressures of said two vessels when replenishing said lower transporting vessel with the powdered particles from said upper vessel while continuing distributing the transportation of the powdered particles to said receiving ends; and controlling commonly the internal pressures of said two vessels by actuating a pressure control valve provided for said upper vessel in accordance with an output of a pressure controller provided for said lower transporting vessel.

3. A method according to claim 1 or 2, the speed of gas passing through the fluidized bed is controlled by an output of a pressure compensated flow rate controller provided in a pressurized gas line communicating a gas supply source with said lower transporting vessel.

4. A method according to claim 1 or 2, wherein each of the flow rate of booster gas is controlled depending upon a differential pressure in each discharge nozzle of the transporting pipes, said discharging nozzle opposed to the fluidized bed in the transporting vessel to discharge the powdered particles.

5. A method according to claim 1 or 2, wherein each of the flow rate of booster gas is controlled in accordance with an output of solid-gas mass-flow meters provided in each of the transporting pipes.

6. A method according to claim 1 or 2, wherein each of the flow rate of booster gas is controlled in accordance with a solid-gas ratio corresponding to each length of the transporting pipes, said solid-gas ratio being adjusted by a mass flow rate of the powdered particles in the transporting vessel per total gas flow rate.

7. An apparatus for distributing powdered particles from a single pressurized dispatch-transporting vessel having a fluidized bed to a plurality of receiving ends, comprising:

a plurality of transporting pipes having discharge nozzles at one end thereof opening to the fluidized bed, the other end of said pipes communicating with the receiving ends, respectively;

a control valve to control a pressurized gas adapted to be supplied to the vessel, said control valve being controlled in accordance with a pressure output adjusted depending upon a primary parameter of a weight changing ratio of the vessel and upon a secondary parameter of an internal pressure of the vessel;

a weight measuring device for measuring a weight of the vessel to provide said weight changing ratio of the vessel;

a plurality of booster gas supply pipes connected to said transporting pipes; and a plurality of flow rate adjusting valves provided for each of said booster gas supply pipes to control flow rate of booster gas in each of said booster gas supply pipes; and detecting means for directly or indirectly detecting a discharging rate of the powdered particles in said respective transporting pipes and producing an output signal to control each of said flow rate adjusting valves.

8. An apparatus for continuously distributing powdered particles from a single pressurized dispatch-transporting vessel having a fluidized bed to a plurality of receiving ends, comprising:

a plurality of transporting pipes having discharge nozzles at one end thereof opening to the fluidized bed, the other end of said pipes communicating with the receiving ends, respectively;

a control valve to control a pressurized gas adapted to be supplied to the vessel, said control valve being controlled in accordance with a pressure output adjusted depending upon a primary parameter of a weight changing ratio of the vessel and upon a secondary parameter of an internal pressure of the vessel;

a weight measuring device for measuring a weight of the vessel to provide said weight changing ratio of the vessel;

a plurality of booster gas supply pipes connected to said transporting pipes; and a plurality of flow rate adjusting valves provided for each of said booster gas supply pipes to control flow rate of booster gas in each of said booster gas supply pipes;

detecting means for directly or indirectly detecting a discharging rate of the powdered particles in said respective transporting pipes and producing an output signal to control each of said flow rate adjusting valves;

an upper pressurized charging vessel communicated in series with the lower transporting vessel through a feed shutoff valve adapted to be opened when the powdered particles are charged from said upper charging vessel to said lower transporting vessel;

a dead weight isolating bellows interposed between said lower and upper vessels;

a pressure equalizing line with an open-close valve connecting said two vessels, said open-close valve being adapted to be opened when the powdered particles are charged from said upper charging vessel to said lower transporting vessel;

a pressure adjusting valve provided for said upper charging vessel, said pressure adjusting valve being controlled in accordance with an internal pressure of the lower transporting vessel when the powdered particles are charged from said upper charging vessel to said lower transporting vessel, whereby the powdered particles are charged to said lower transporting vessel with continuing to distributing the powdered particles.

9. An apparatus according to claim 7 or 8, wherein each of said detecting means comprises a differential pressure detector of said discharge nozzle in each of the transporting pipes.

10. An apparatus according to claim 7 or 8, wherein each of said detecting means comprises a solid-gas mass-flow meter in each of the transporting pipes.

11. An apparatus according to claim 8, wherein said dead weight isolating bellows have a portion allowing the powdered particles to pass therethrough and is adapted for balancing the pressures of said lower and upper vessels.

12. An apparatus for distributing powdered particles from a single pressurized dispatch-transporting vessel having a fluidized bed to a plurality of receiving ends, comprising:

a plurality of transporting pipes having discharge nozzles at one end thereof opening to the fluidized bed, the other end of said pipes communicating with the receiving ends, respectively;

a control valve to control a pressurized gas adapted to be supplied to the vessel, said control valve being controlled in accordance with a pressure output adjusted depending upon a primary parameter of a weight changing ratio of the vessel and upon a secondary parameter of an internal pressure of the vessel;

a weight measuring device for measuring a weight of the vessel to provide said weight changing ratio of the vessel;

a plurality of booster gas supply pipes connected to said transporting pipes; and a plurality of flow rate adjusting valves provided for each of said booster gas supply pipes to control flow rate of booster gas in each of said booster gas supply pipes;

a solid-gas ratio controller receiving a total flow rate signal of gas and a mass-flow rate signal of the powdered particles and providing a common output signal of the mass flow rate of the powdered particles in the transporting vessel per total gas flow rate; and a plurality of ratio setters receiving the common output signal of said solid-gas ratio controller and provided for controlling each of said flow rate adjusting valves, each of said ratio setters having a predetermined setting ratio depending on each length of the transporting pipes.

* * * * *